(12) United States Patent
Ichikawa

(10) Patent No.: US 10,237,938 B2
(45) Date of Patent: Mar. 19, 2019

(54) DRIVE CIRCUIT AND VEHICLE LAMP

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/974,200

(22) Filed: May 8, 2018

(65) Prior Publication Data

US 2018/0332680 A1 Nov. 15, 2018

(30) Foreign Application Priority Data

May 11, 2017 (JP) ................................ 2017-094458

(51) Int. Cl.
| | |
|---|---|
| *H05B 33/08* | (2006.01) |
| *B60Q 1/14* | (2006.01) |
| *F21S 41/30* | (2018.01) |
| *F21S 41/675* | (2018.01) |
| *F21S 41/141* | (2018.01) |

(52) U.S. Cl.
CPC ....... *H05B 33/0845* (2013.01); *B60Q 1/1415* (2013.01); *F21S 41/30* (2018.01); *F21S 41/675* (2018.01); *H05B 33/0815* (2013.01); *F21S 41/141* (2018.01)

(58) Field of Classification Search
CPC .... H05B 37/02; H05B 33/08; H05B 33/0803; H05B 33/0815; H05B 33/0845; H05B 33/083; H05B 33/0842; B60Q 1/14; B60Q 1/1407; B60Q 1/1415
See application file for complete search history.

(56) References Cited

U.S. PATENT DOCUMENTS

| | | | | |
|---|---|---|---|---|
| 2,886,611 | A | * 5/1959 | King | ................. C07C 7/005 |
| | | | | 203/37 |
| 2014/0265890 | A1 | * 9/2014 | Ito | ................. B60Q 1/00 |
| | | | | 315/186 |
| 2014/0313755 | A1 | 10/2014 | Tanaka | |
| 2016/0096467 | A1 | * 4/2016 | Murakami | ......... H05B 33/0815 |
| | | | | 315/82 |
| 2018/0014395 | A1 | * 1/2018 | Ichikawa | ................. F21S 41/00 |

FOREIGN PATENT DOCUMENTS

| | | |
|---|---|---|
| JP | 2011-162087 A | 8/2011 |
| JP | 2014-216049 A | 11/2014 |

* cited by examiner

*Primary Examiner* — Thai Pham
(74) *Attorney, Agent, or Firm* — Osha Liang LLP

(57) ABSTRACT

A drive circuit is configured to drive a light emitting unit which is provided in a vehicle lamp and includes a plurality of semiconductor light emitting elements connected in series. The drive circuit includes a drive voltage generation unit configured to reduce an input voltage from a battery to generate a drive voltage for driving the semiconductor light emitting elements, and a control unit configured to perform ON/OFF control for a bypass switch connected in parallel to a part of the semiconductor light emitting elements and to perform interlock dimming control when the input voltage becomes a first threshold value or lower. The interlock dimming control selects a dimming mode and increases an ON ratio per unit time of the bypass switch as the input voltage drops in the dimming mode.

6 Claims, 9 Drawing Sheets

DRIVE CIRCUIT AND VEHICLE LAMP

CROSS-REFERENCE TO RELATED APPLICATIONS

The present application claims the benefit of priority of Japanese Patent Application No. 2017-094458, filed on May 11, 2017, the content of which is incorporated herein by reference.

TECHNICAL FIELD

Aspects of the present invention relate to a drive circuit configured to drive a light emitting unit which is provided in a vehicle lamp and includes a plurality of semiconductor light emitting elements connected in series, and a vehicle lamp including the light emitting unit and the drive circuit.

BACKGROUND

A light emitting unit of a vehicle lamp uses a semiconductor light emitting element, for example, a Light Emitting Diode (LED), or the like. In this case, a plurality of semiconductor light emitting elements are connected in series in view of the fact that a light amount of a single chip of the semiconductor light emitting element is insufficient. For example, in a vehicle lamp as a headlamp, a light emitting unit in which two LED chips are connected in series is often used.

A Forward Voltage (VF) of a white LED used for a headlamp is approximately 3.5 V per chip, so that a VF of a series-connected LED circuit in the two-chip light emitting unit is approximately 7.0 V. That is, a drive voltage of the LED circuit may be 7.0 V or higher in this case.

Since a battery voltage of an automobile is generally approximately 12 V, in a drive circuit configured to drive the light emitting unit, an input voltage (a battery voltage) is reduced to generate a drive voltage. In order to reduce the battery voltage, for example, a buck switching converter, a series regulator, a current limiting resistor or the like can be used.

Herein, the battery voltage may fluctuate under various conditions, and the battery voltage may drop to approximately 5 V to 6 V in some cases. For example, the input voltage may become lower than 7 V by cranking or the like at the time of engine starting, so that the light amount of the LED sharply decreases. The vehicle lamp is required to maintain a light emitting state even with such a large drop of the battery voltage, so that it is conceivable to adopt a configuration which not only reduces the input voltage but also has a boost function as the drive circuit. However, the number of circuit parts of a buck-boost converter is larger than that of a buck converter and the cost is increased.

In the case of using a buck drive circuit, in order to prevent all LEDs from being turned off due to the drop of the battery voltage, a configuration may be adopted in which a bypass switch is connected in parallel to a part of the LEDs and turned on according to the input voltage dropped to a predetermined value (that is, the part of the LEDs is short-circuited) (for example, see JP-A-2011-162087). Accordingly, even if the input voltage sharply drops, it is possible to maintain a light emitting state of the LEDs other than the part of the LEDs, and it is possible to prevent the LEDs from being all turned off.

However, according to the technique of JP-A-2011-162087, since the light amount of the part of the LEDs sharply decreases at the same time as the input voltage becomes a predetermined value or lower, there is a fear that this is visually recognized as flickering.

SUMMARY

Accordingly, an aspect of the present invention overcomes the above problems and suppresses the flickering, while preventing the semiconductor light emitting element from being all turned off due to the drop of the input voltage.

According to an embodiment of the present invention, there is provided a drive circuit configured to drive a light emitting unit which is provided in a vehicle lamp and includes a plurality of semiconductor light emitting elements connected in series. The drive circuit includes: a drive voltage generation unit configured to reduce an input voltage from a battery to generate a drive voltage for driving the semiconductor light emitting elements; and a control unit configured to perform ON/OFF control for a bypass switch connected in parallel to a part of the semiconductor light emitting elements and to perform an interlock dimming control which selects a dimming mode when the input voltage becomes a first threshold value or lower and increases an ON ratio per unit time of the bypass switch as the input voltage drops in the dimming mode.

Accordingly, when the input voltage drops, a light emission amount of a part of the semiconductor light emitting elements gradually decreases in conjunction with the drop of the input voltage, and it is possible to prevent the light emission amount of the part of the semiconductor light emitting elements from sharply decreasing.

In the above drive circuit, the control unit may be configured to maintain the bypass switch in an ON state in the diming mode in a state where the input voltage has dropped to a second threshold value or lower which is smaller than the first threshold value.

Accordingly, the part of the semiconductor light emitting elements is forcibly turned off in a state where the input voltage has dropped below the second threshold value.

In the above drive circuit, the control unit may be configured to perform the interlock dimming control based on a Pulse Width Modulation (PWM) signal obtained by slicing a triangular wave with a threshold value according to a value of the input voltage.

Accordingly, it suffices to provide at least a triangle wave generation circuit and a comparator in generating a control signal for the interlock dimming control.

In the above drive circuit, the vehicle lamp may be a variable light distribution type vehicle lamp which includes a movable reflector having a reflecting surface for reflecting light emitted from the light emitting unit and configured to change a direction of the reflected light from the reflecting surface according to an operation position to change a light distribution pattern, and a bypass switch is connected in parallel to each of the plurality of semiconductor light emitting elements in the light emitting unit, and the control unit may be configured to perform the interlock dimming control during a period in which a turning-on instruction signal input for light distribution control instructs turning-on of the semiconductor light emitting elements.

Accordingly, it is possible to prevent the semiconductor light emitting elements from erroneously being turned on along with the interlock dimming control during a period in which the semiconductor light emitting elements should be turned off for light distribution control.

In the above drive circuit, an OFF period of the bypass switch by the interlock dimming control may be shorter than a scan period of light by the movable reflector.

Accordingly, it is possible to reduce the change with time in a superseding amount of the turning-off period instructed by the turning-on instruction signal to the turning-on period of the semiconductor light emitting elements by the interlock dimming control.

Further, according to another embodiment of the present invention, there is provided a vehicle lamp including the drive circuit and the light emitting unit as described above.

Such a vehicle lamp can also obtain effects similar to the above-described drive circuit.

According to the above-described configuration, it is possible to suppress flickering while preventing the semiconductor light emitting elements from being all turned off due to the drop of the input voltage.

DETAILED DESCRIPTION

Hereinafter, a drive circuit and a vehicle lamp according to embodiments of the present invention will be described with reference to drawings.

Figure 1:
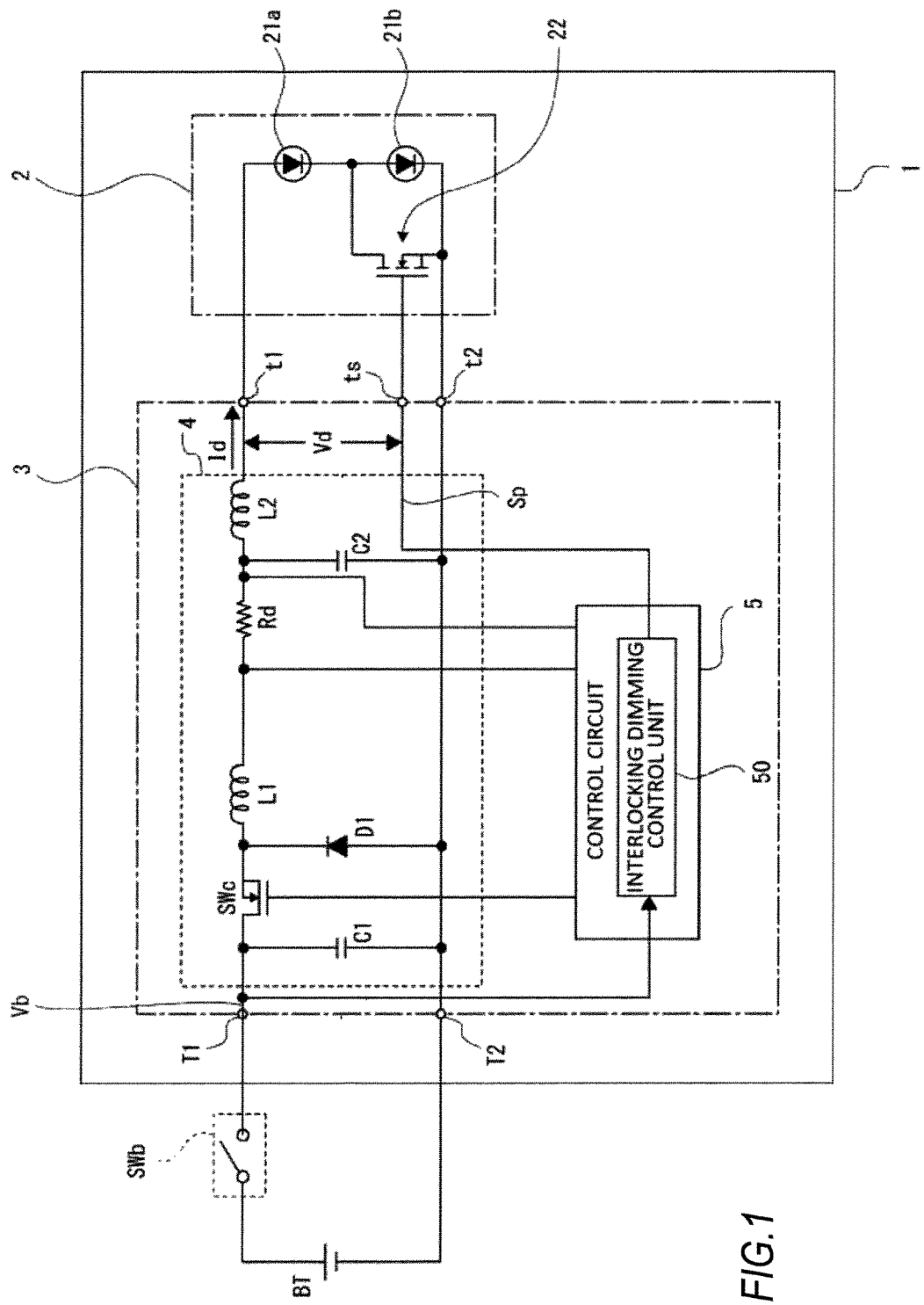
FIG. 1 is a diagram for illustrating a circuit configuration of a vehicle lamp according to a first embodiment.

FIG. 1 is a circuit block diagram for illustrating a schematic internal configuration of a vehicle lamp 1 according to a first embodiment. FIG. 1 shows an on-vehicle battery BT which is provided in the vehicle and outside the vehicle lamp 1 and an input switch SWb for performing ON/OFF of an input voltage from the on-vehicle battery BT to the vehicle lamp 1.

In the embodiment, it is assumed that an output voltage (a battery voltage) of the battery BT is approximately 12 V.

The vehicle lamp 1 is a head lamp (a vehicle headlamp), a pair of which are disposed on left and right sides of a front end portion of the vehicle.

As shown in the drawing, the vehicle lamp 1 includes a light emitting unit 2 having a plurality of semiconductor light emitting elements 21 and a drive circuit 3 for driving the semiconductor light emitting elements 21 to emit light based on the input voltage from the on-vehicle battery BT.

The light emitting unit 2 has two semiconductor light emitting elements 21 (semiconductor light emitting elements 21a, 21b), and the semiconductor light emitting element 21a and the semiconductor light emitting element 21b are connected in series. In addition, the light emitting unit 2 has a bypass switch 22 connected in parallel to the semiconductor light emitting element 21b. The bypass switch 22 of the embodiment is configured by a Metal-Oxide-Semiconductor Field-Effect Transistor (MOSFET).

In the embodiment, as the semiconductor light emitting elements 21a, 21b, a white LED (an LED having a light emission color of white) is used, and each Forward Voltage (VF) thereof is approximately 3.5 V. That is, a VF of a series connection circuit in which the semiconductor light emitting elements 21a, 21b are connected in series is approximately 7 V.

The drive circuit 3 includes a drive voltage generation unit 4 and a control circuit 5.

For the drive circuit 3, an input voltage Vb is supplied between terminals T1, T2 via the input switch SWb from the on-vehicle battery BT. The input switch SWb is a switch for supplying the input voltage Vb to the vehicle lamp 1 according to an ON operation of the headlamp by a driver or the like of the vehicle.

The drive circuit 3 is disposed in a lamp chamber of the vehicle lamp 1 together with the light emitting unit 2.

The drive voltage generation unit 4 converts the input voltage Vb supplied between the terminals T1, T2 to generate a drive voltage Vd of the light emitting unit 2 and causes a current Id to flow into the semiconductor light emitting elements 21 of the light emitting unit 2 based on the drive voltage Vd.

The drive voltage generation unit 4 includes inductors L1, L2, a converter switch SWc, a diode D1, and capacitors C1, C2 and is configured as a non-insulated buck choke converter. As shown in the drawing, the converter switch SWc and the inductor L1 are connected in series on a positive electrode line between terminals T1, t1. In addition, in the embodiment, a current detection resistor Rd and an inductor L2 are also connected in series on the positive electrode line.

The capacitor C1 is connected between the terminals T1, T2 (between the positive electrode line and a negative electrode line). An anode of the diode D1 is connected to the negative electrode line, and a cathode thereof is connected to a connection point of the converter switch SWc and the inductor L1. The capacitor C2 as a smoothing capacitor for output is connected between a connection point between one end of the current detection resistor Rd and one end of the inductor L2 and the negative electrode line.

The converter switch SWc is configured by a switching element, for example, a Metal-Oxide-Semiconductor Field-Effect Transistor (MOSFET), or the like. A switching control signal is supplied to the gate of the converter switch SWc from the control circuit 5.

With this configuration, the drive voltage generation unit 4 performs DC-DC conversion. That is, the converter switch SWc repeatedly performs ON/OFF according to the switching control signal, so that the drive voltage Vd is generated by reducing the input voltage Vb and a drive current Id flows into the light emitting unit 2.

The one end of the current detection resistor Rd is connected to an anode of a LED as the semiconductor light emitting element 21a via the inductor L2 and the terminal t1 and the other end thereof is connected to the inductor L1. A both-end voltage of the current detection resistor Rd is input to the control circuit 5 such that the control circuit 5 can detect the drive current Id from the both-end voltage.

A cathode side of the LED in the light emitting unit 2 is connected to a terminal t2 of the drive circuit 3. The terminal t2 is connected to the negative electrode line described above.

The control circuit 5 generates an error signal with respect to a target constant current value from the both-end voltage of the current detection resistor Rd and controls a switching operation of the converter switch SWc in the drive generation unit 4 based on the error signal such that a current value of the drive current Id matches the target value. Accordingly, constant current control of the drive current Id is performed. That is, the constant current control is performed by controlling ON duty of the switching control signal such that the current value of the drive current Id matches the target value. Accordingly, the drive current Id having a predetermined current value based on the output voltage (drive voltage Vd) of the drive voltage generation unit 4 flows into the semiconductor light emitting elements 21 in the light emitting unit 2, so that the semiconductor light emitting elements 21 emit light.

Further, the control circuit 5 has an interlock dimming control unit 50. The interlock dimming control unit 50 generates a dimming signal Sp for ON/OFF control of the bypass switch 22 based on the input voltage Vb. The dimming signal Sp is supplied to a control terminal (a gate of the MOSFET in the embodiment) of the bypass switch 22 via a terminal ts provided in the drive circuit 3.

When a detection value of the input voltage Vb is equal to or lower than a first threshold value TH1, the interlock dimming control unit 50 selects a dimming mode for the semiconductor light emitting element 21b to which the bypass switch 22 is connected. When the detection value of the input voltage Vb is larger than the first threshold value TH1, the interlock dimming control unit 50 selects a non-dimming mode. In the case of the first embodiment, the bypass switch 22 is maintained in an OFF state in the non-dimming mode.

Figure 2:
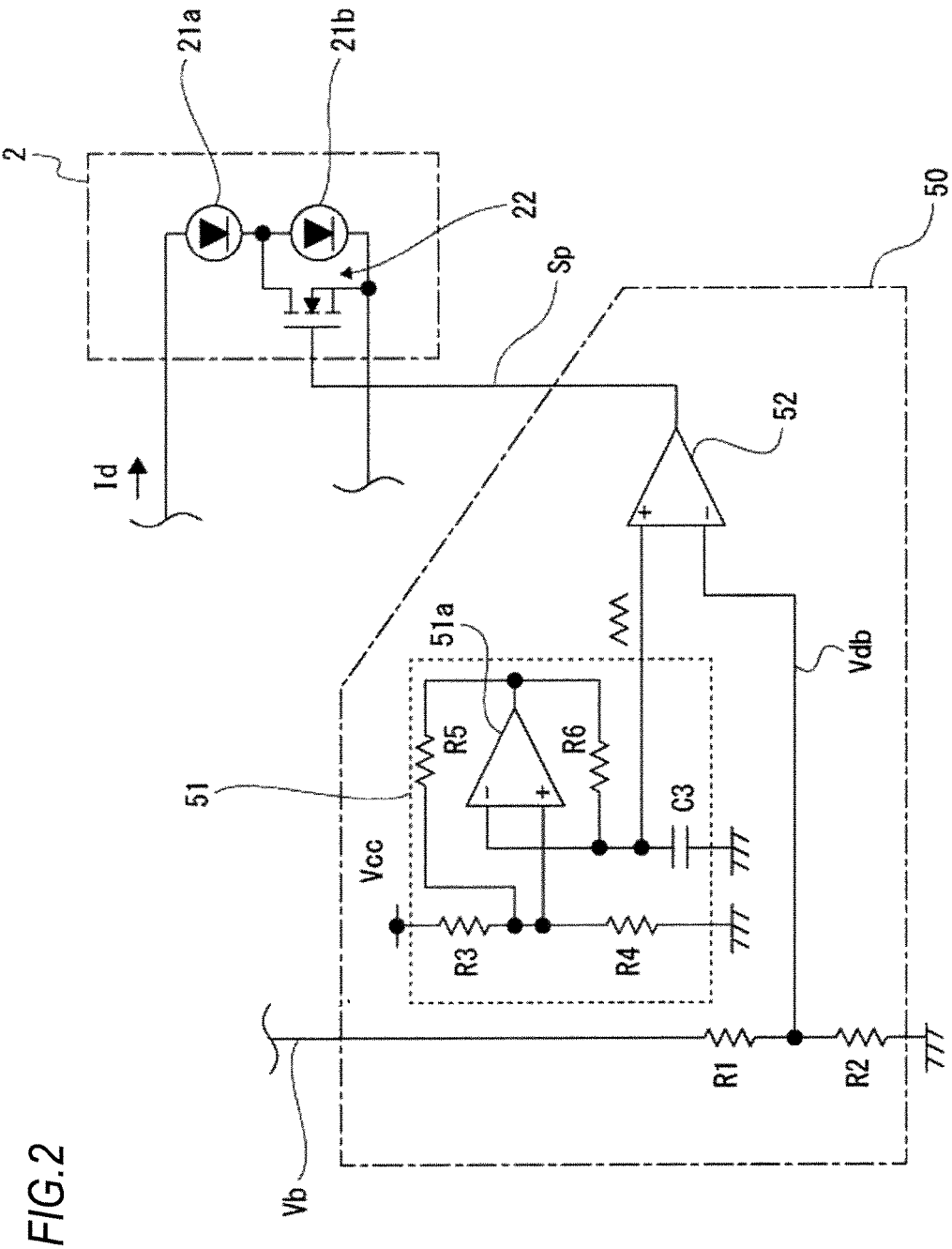
FIG. 2 is a diagram for illustrating an exemplary internal configuration of an interlock dimming control unit in the first embodiment.

FIG. 2 is a diagram for illustrating an exemplary internal configuration of the interlock dimming control unit 50 and also shows an internal circuit configuration of the interlock dimming control unit 50 and the light emitting unit 2 shown in FIG. 1. In FIG. 2, illustration of the terminal ts is omitted.

The interlock dimming control unit 50 includes a voltage division circuit by a series connection circuit of a resistor R1 and a resistor R2 inserted between the input voltage Vb and a ground, a triangular wave generation circuit 51 configured to generate a triangular wave, and a comparator 52 to which a triangular wave signal output by the triangular wave generation circuit 51 and an output signal of the voltage division circuit are input.

The output signal of the voltage division circuit is a signal corresponding to the detected value of the input voltage Vb and is hereinafter referred to as an input voltage equivalent signal Vdb. In the embodiment, resistance values of resistors R1, R2 in the voltage division circuit are set so as to divide the input voltage Vb into ⅓.

In the example shown in the drawing, the triangular wave generation circuit 51 generates a triangular wave by combining a Schmitt circuit including a comparator 51a and resistors R3, R4, R5 and an integrating circuit by a resistor R6 and a capacitor C3, but the configuration for generating the triangle wave is not limited thereto.

The triangular wave signal output by the triangular wave generation circuit 51 is input to a positive input terminal of the comparator 52. The input voltage equivalent signal Vdb is input to a negative input terminal of the comparator 52.

In this case, the input voltage equivalent signal Vdb functions as a threshold (slice level) for slicing the triangular wave in the comparator 52. The comparator 52 outputs a rectangular wave signal as a dimming signal Sp obtained by slicing the triangular wave signal with a threshold value as the input voltage equivalent signal Vdb according to the value of the input voltage Vb. In this case, the dimming signal Sp has a pulse width which changes according to the change of the input voltage Vb, i.e., the dimming signal is an example of the Pulse Width Modulation (PWM) signal.

Figure 3A:
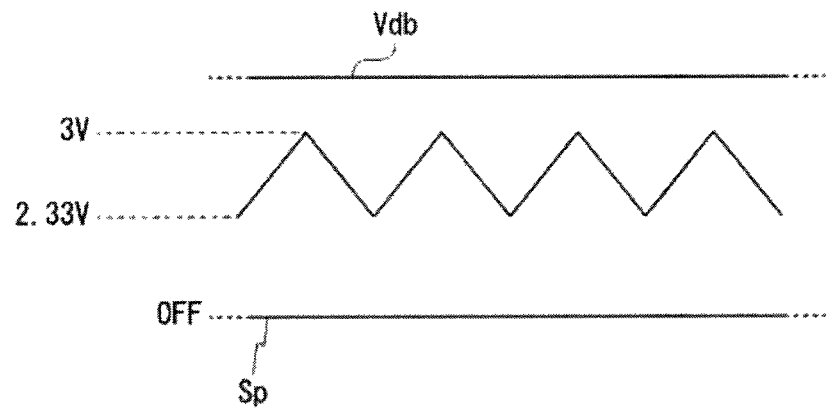
FIGS. 3A to 3C are waveform diagrams for illustrating the interlock dimming control unit in the first embodiment.
Figure 3B:
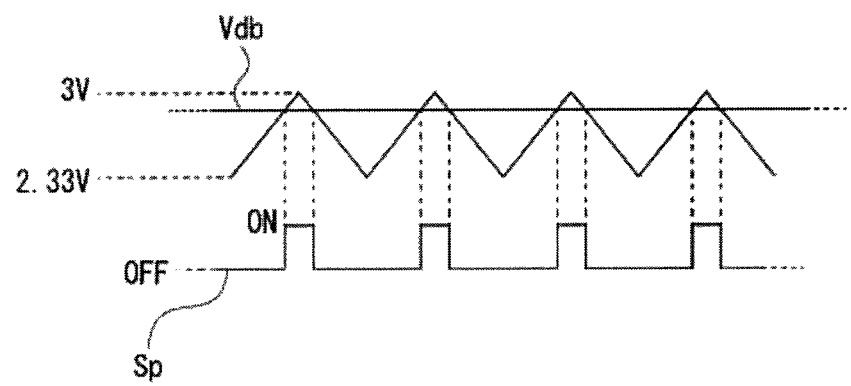
Figure 3C:
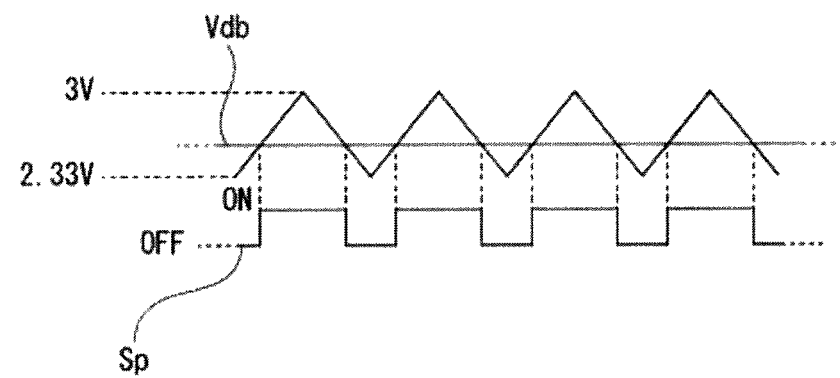

FIGS. 3A to 3C illustrate relationships between the triangular wave signal, the input voltage equivalent signal Vdb, and the dimming signal Sp.

In the embodiment, a peak level of the triangular wave signal is set to 3 V and a bottom level is set to 2.33 V corresponding to the fact that the resistors R1, R2 divide the input voltage Vb into ⅓ as described above.

Therefore, as shown in FIG. 3A, when the input voltage equivalent signal Vdb is 3 V or higher (i.e., the input voltage Vb is 9 V or higher), the dimming signal Sp maintains an OFF level. That is, when the input voltage Vb is sufficiently higher than the VF of the LED series connection circuit, the bypass switch 22 maintains the OFF state and the semiconductor light emitting element 21b maintains a turning-on state.

On the other hand, as shown in FIGS. 3B and 3C, when the input voltage equivalent signal Vdb is below 3 V, an ON period occurs in the dimming signal Sp. That is, there is a period in which the semiconductor light emitting element 21b is turned off. At this time, under a condition that the input voltage equivalent signal Vdb satisfies: 3 V>Vdb>2.33 V (i.e., a condition of 9 V>Vb>7 V for the input voltage Vb), the more the input voltage Vb drops, the more ON ratio per unit time in the dimming signal Sp (proportion of the ON period in one cycle of the triangular wave signal) becomes, and the dimming signal Sp is maintained in an ON state when the input voltage equivalent signal Vdb drops to 2.33 V or lower.

Figure 4:
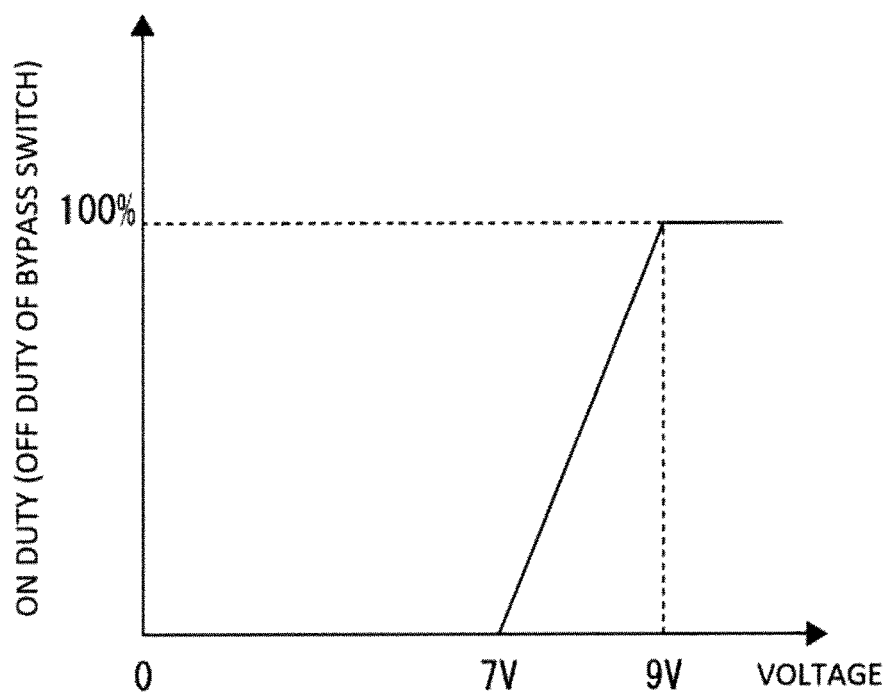
FIG. 4 is a diagram for illustrating a relationship between an input voltage and turning-on duty of a semiconductor light emitting element in the interlock dimming control.

FIG. 4 shows a relationship between the input voltage Vb and turning-on duty of the semiconductor light emitting element 21b.

With the above dimming signal Sp, the turning-on duty is maintained at 100% (i.e., the turning-on state is maintained) when the input voltage Vb is 9 V or higher, and the turning-on duty becomes smaller when the input voltage Vb drops to from 9 V to 7 V. When the input voltage Vb is 7 V or lower, the turning-on duty is maintained at 0% (i.e., the turning-off state is maintained).

As described above, in the embodiment, control ("interlock dimming control") which increases an ON ratio per unit time as the input voltage Vb drops is performed for the bypass switch 22 connected in parallel to the semiconductor light emitting element 21b.

According to the technique of JP-A-2011-162087 described above, the bypass switch is immediately switched to a state where the bypass switch is kept in the ON state when the input voltage Vb becomes equal to or less than a constant value, so that the light amount sharply changes as the battery voltage drops, thereby causing flickering.

On the other hand, in the embodiment, since the semiconductor light emitting element 21b gradually becomes darker as the input voltage Vb drops, a sharp change in the light amount can be prevented and flickering can be suppressed. Furthermore, when the input voltage Vb is equal to or less than the constant value, the semiconductor light emitting element 21b is maintained in the OFF state, so that it is possible to prevent the situation where the semiconductor light emitting elements 21 are all turned off due to the drop of the input voltage Vb.

It should be noted that "9 V" (a dimming start threshold for the drop of the input voltage Vb) and "7 V" (a turning-off start threshold for the drop of the input voltage Vb) are merely examples, and therefore, the peak level and the bottom level of the triangular wave signal is not limited to the values exemplified above.

Herein, a dimming start threshold exemplified as "9 V" in the above description corresponds to the first threshold value TH1 for the interlock dimming control unit 50 to select the dimming mode described above.

Further, when the input voltage Vb is equal to or less than the turning-off start threshold value exemplified as "7 V", the interlock dimming control unit 50 maintains the bypass switch 22 in the ON state, it can be said to maintain the bypass switch 22 in the ON state in a state where the input voltage Vb has dropped below the second threshold value TH2 which is smaller than the first threshold value TH1.

A second embodiment will be described.

Figure 5:
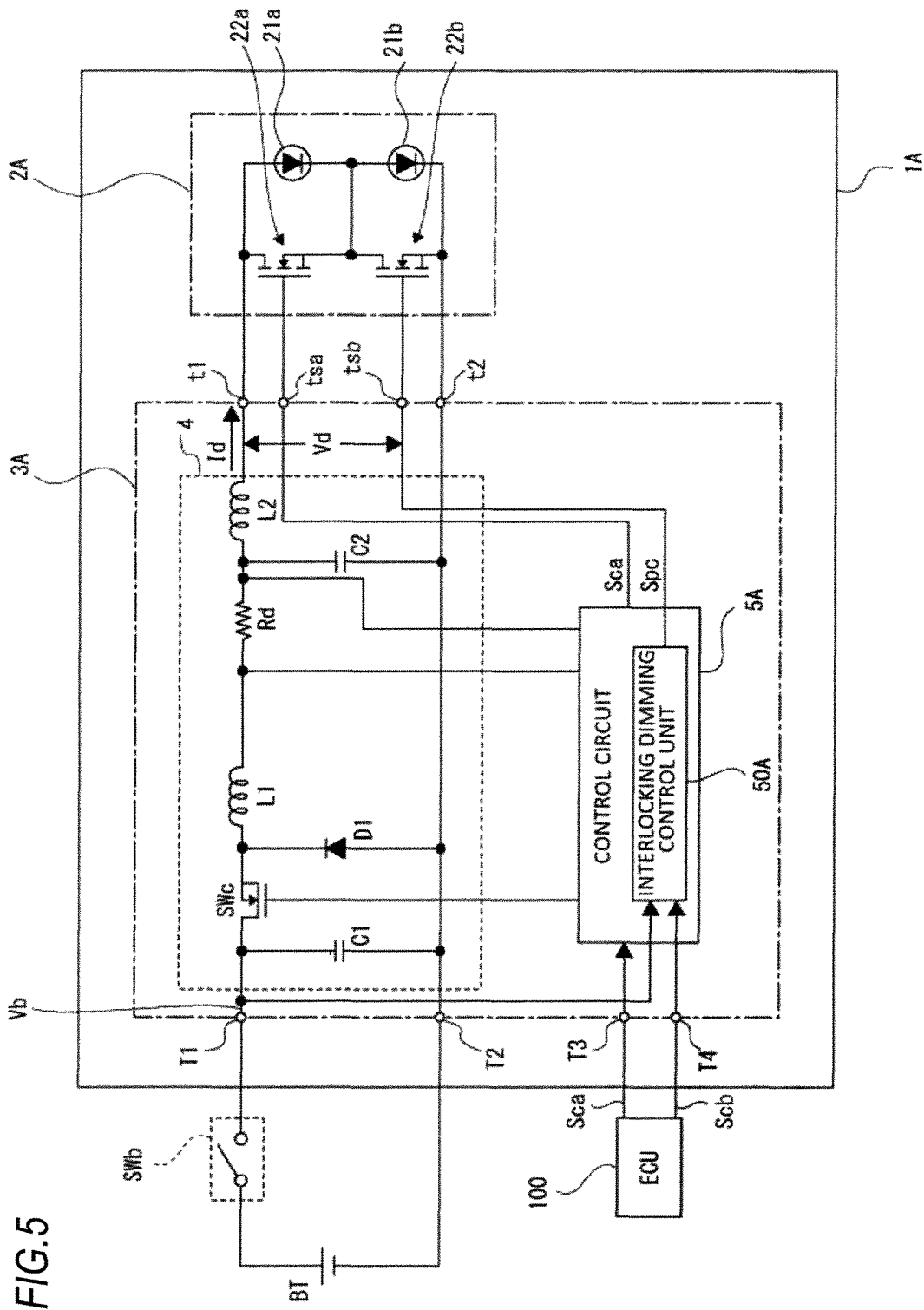
FIG. 5 is a diagram for illustrating a circuit configuration of a vehicle lamp according to a second embodiment.
Figure 6:
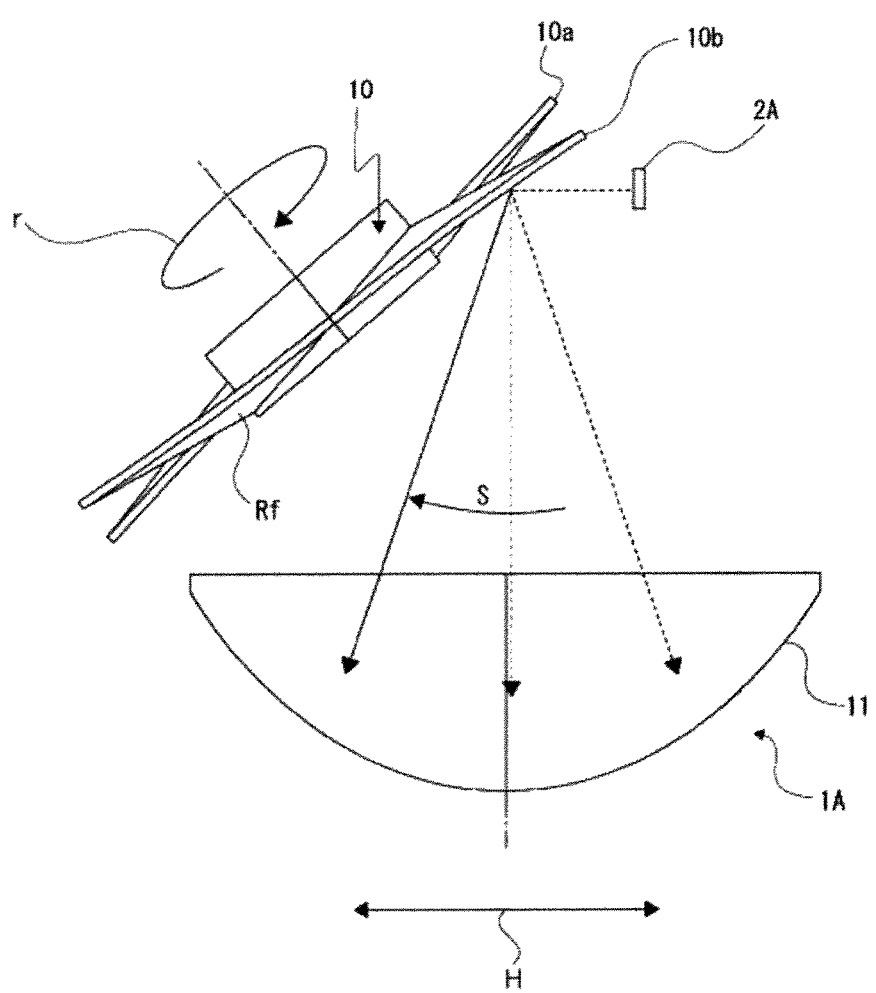
FIG. 6 is a diagram for illustrating an exemplary configuration of an optical system included in the vehicle lamp of the second embodiment.

FIG. 5 is a circuit block diagram for illustrating a schematic internal configuration of the vehicle lamp 1A according to the second embodiment, and FIG. 6 is a diagram for illustrating an exemplary schematic configuration of an optical system of the vehicle lamp 1A.

The vehicle lamp 1A of the second embodiment is configured as a variable light distribution type vehicle lamp which is capable of changing a light distribution pattern.

In the following description, same reference numerals are given to the same parts as already described, and description thereof is omitted.

First, referring to FIG. 5, a circuit configuration of the vehicle lamp 1A will be described.

FIG. 5 also shows an Electronic Control Unit (ECU) 100 provided in the vehicle and outside the vehicle lamp 1A.

The vehicle lamp 1A includes a light emitting unit 2A and a drive circuit 3A, instead of the light emitting unit 2 and the drive circuit 3.

The light emitting unit 2A is different from the light emitting unit 2 in that the light emitting unit 2A includes a bypass switch 22a connected in parallel to the semiconductor light emitting element 21a. In the second embodiment, the bypass switch 22 connected in parallel to the semiconductor light emitting element 21b is referred to as a "bypass switch 22b".

The drive circuit 3A is different from the drive circuit 3 in that a control circuit 5A is provided instead of the control circuit 5, terminals T3, T4, tsa are added, and a terminal tsb is provided instead of the terminal ts.

The control circuit 5A is different from the control circuit 5 in that an interlock dimming control unit 50A is provided instead of the interlock dimming control unit 50.

The terminals T3, T4 function as input terminals for a turning-on instruction signal Sc which is a signal for instructing turning-on and turning-off timing of the semiconductor light emitting elements 21a, 21b in light distribution control. In the embodiment, an individual signal is used as the turning-on instruction signal Sc for each of the semiconductor light emitting elements 21a, 21b. Specifically, the turning-on instruction signal Sc for the semiconductor light emitting element 21a is a "turning-on instruction signal Sca", the turning-on instruction signal Sc for the semiconductor light emitting element 21b is a "turning-on instruction signal Scb".

In the embodiment, the turning-on instruction signal Sc is output from the ECU 100 provided on the vehicle side as shown in the drawing, and the turning-on instruction signal Sca and the turning-on instruction signal Scb are input to the control circuit 5A via the terminal T3 and the terminal T4 respectively.

The turning-on instruction signal Sca is supplied to a control terminal of the bypass switch 22a (in this case, for example, the gate of the MOSFET) via a terminal tsa. The turning-on instruction signal Scb is input to the interlock dimming control unit 50A and is used for generating a control signal Spc (described later). The control signal Spc is supplied to the control terminal of the bypass switch 22b via the terminal tsb.

As shown in FIG. 6, in the optical system of the vehicle lamp unit 1A, a movable reflector 10 is provided as a reflector for reflecting light emitted from the light emitting unit 2A and guiding the light toward a projection lens 11. The movable reflector 10 has a reflecting surface Rf for reflecting the light emitted from the light emitting unit 2A and serves as a reflector which changes the direction of the reflected light from the reflecting surface Rf according to an operation position.

For example, the movable reflector 10 of the embodiment is rotated in a predetermined rotation direction r similarly to a "movable reflector 9" illustrated in JP-A-2014-216049, so that a direction of the reflected light is changed in a horizontal direction H according to a rotation position. That is, the reflected light scans in the horizontal direction H. The movable reflector 10 illustrated in FIG. 6 has two blade portions (blade portions 10a, 10b) similarly to the movable reflector 9 in JP-A-2014-216049, and the reflected light can scan twice in a scan direction indicated by an arrow S in the drawing per rotation in the rotation direction r.

In the vehicle lamp 1A, scanning of the light projected via the projection lens 11 in the horizontal direction H is repeated at a cycle according to a rotational speed of the movable reflector 10 by the configuration of the optical system. Hereinafter, a cycle in which the scanning of the projection light is repeated is referred to as a "scan cycle", and a period in which one scan is performed is referred to as "one scan period". Incidentally, the scan cycle is set to be, for example, approximately 200 Hz to 300 Hz.

Figure 7:
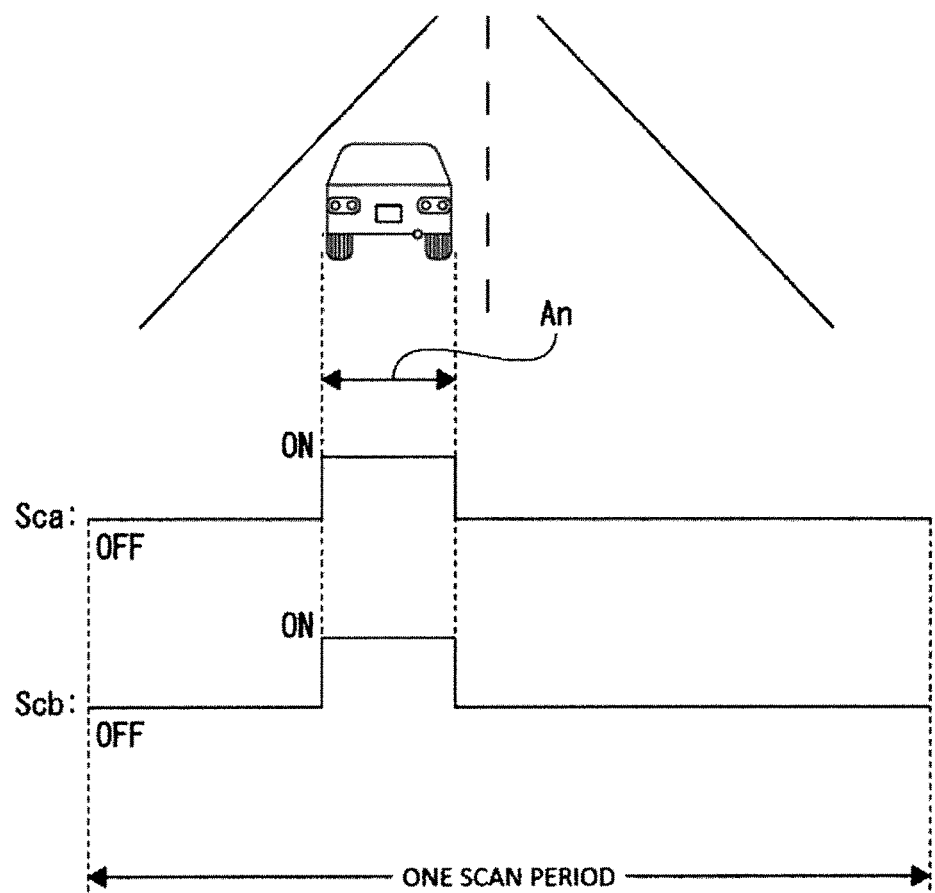
FIG. 7 is an illustrative diagram of a turning-on instruction signal in light distribution control.

FIG. 7 is an illustrative diagram of the turning-on instruction signal Sc in the light distribution control.

For example, when there is an area (referred to as "non-illumination target area An") in which light should not be illuminated in the light distribution control such as an area where a preceding vehicle presents, under the repeated scanning of the light in the horizontal direction H as described above, the light emitting unit 2A is turned off at the timing when the projection light overlaps with the non-illumination target area An.

That is, the turning-on instruction signals Sca, Scb for ON/OFF control of the bypass switches 22a, 22b are generated as signals which turn on the bypass switches 22a, 22b respectively at the timing when the projection light overlaps with the non-illumination target area An in each scan period as described above (the semiconductor light emitting elements 21a, 21b is turned off).

Figure 8:
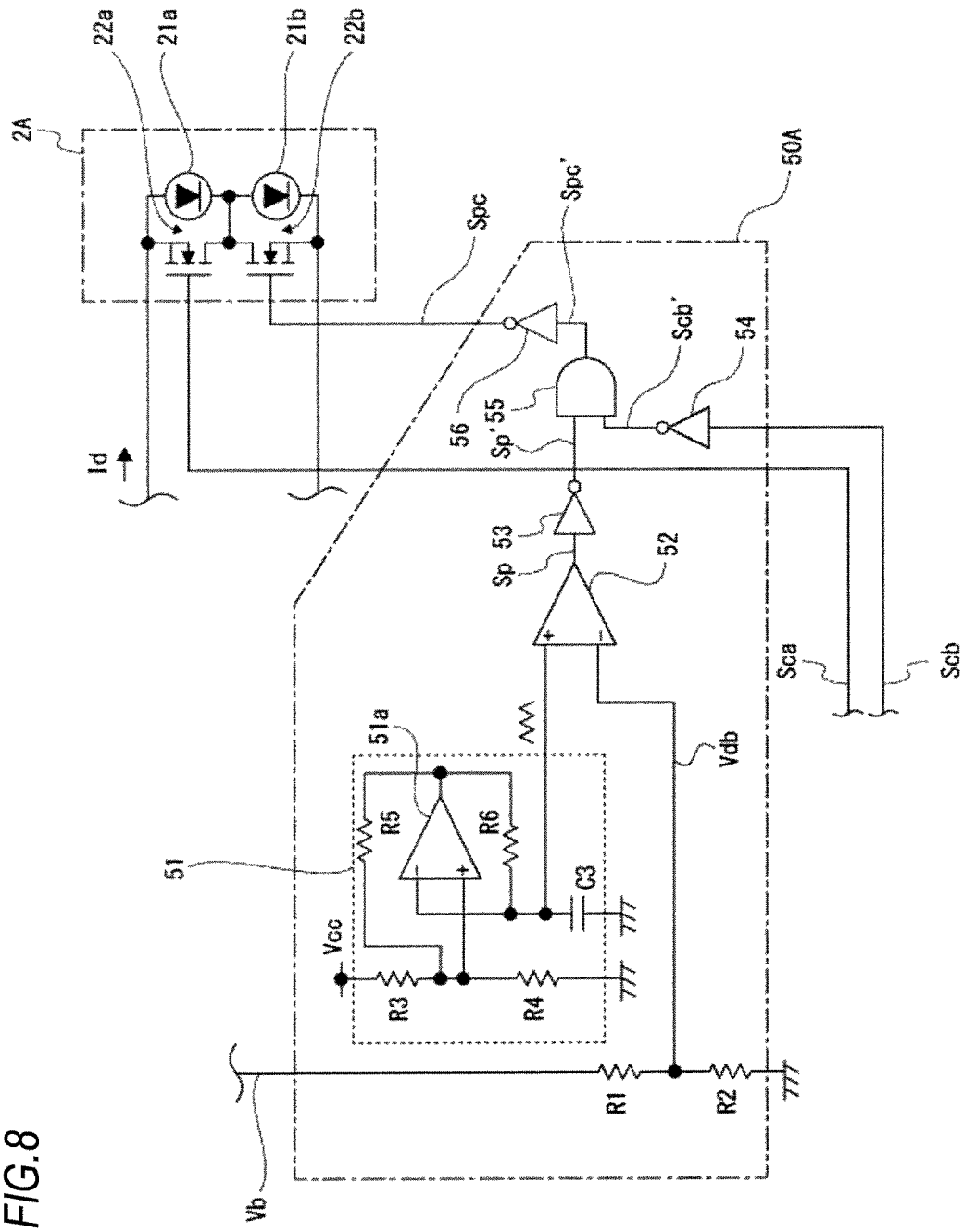
FIG. 8 is a diagram for illustrating an exemplary internal configuration of an interlock dimming control unit according to the second embodiment.

FIG. 8 is a diagram for illustrating an exemplary internal configuration of the interlock dimming control unit 50A and also shows the internal circuit configuration of the interlock dimming control unit 50A as well as the light emitting unit 2A (terminals tsa, tsb are omitted).

The interlock dimming control unit 50A is different from the interlock dimming control unit 50 in that an inverting circuit 53, an inverting circuit 54, an AND gate circuit 55, and an inverting circuit 56 are added.

As shown in the drawing, the dimming signal Sp output from the comparator 52 is inverted in polarity by the inverting circuit 53 and input to the AND gate circuit 55 as an inverted signal Sp'. The turning-on instruction signal Scb is inverted in polarity by the inverting circuit 54 and input to the AND gate circuit 55 as an inverted signal Scb'.

The output signal Spc' of the AND gate circuit 55 is inverted in polarity by the inverting circuit 56 and supplied to the control terminal of the bypass switch 22b as the control signal Spc.

Figure 9:
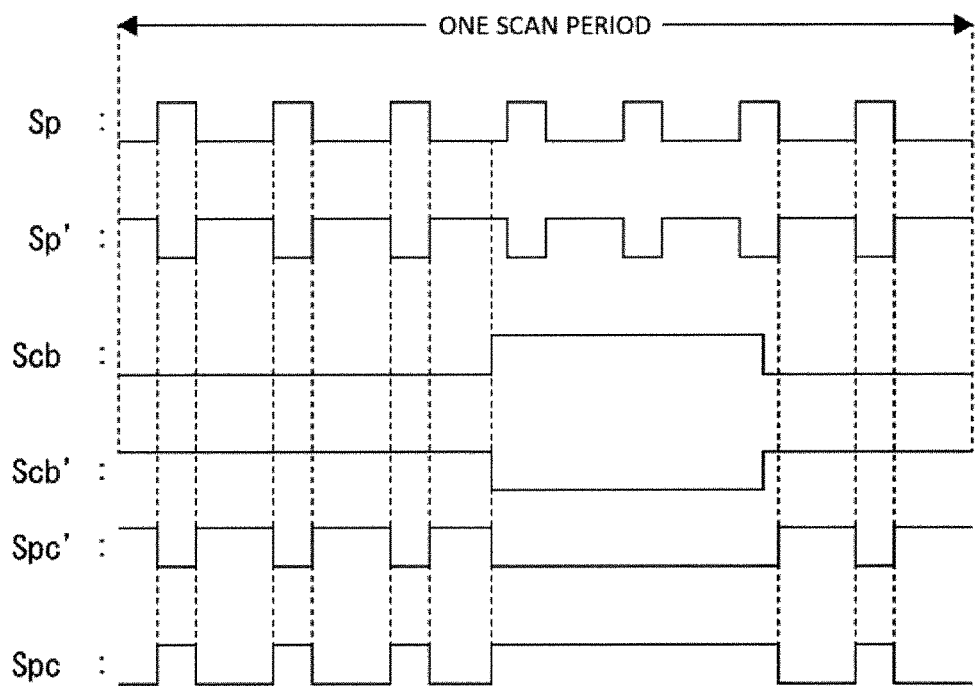
FIG. 9 is an illustrative diagram of a control method of a bypass switch in the second embodiment.

FIG. 9 is an illustrative diagram of a control method of the bypass switch 22b in the second embodiment and illustrates a relationship between the dimming signal Sp, the turning-on instruction signal Scb, the inverting signals Sp', Scb', the output signal Spc', and the control signal Spc.

By the AND gate circuit 55, an ON/OFF instruction of the bypass switch 21b based on the dimming signal Sp is directly reflected in the control signal Spc during a period in which the inverting signal Scb' is at a High level, i.e., during a period in which the turning-on instruction signal Scb instructs OFF of the bypass switch 21b (a turning-on instruction period of the semiconductor light emitting element 21b).

On the other hand, in a period (a turning-off instruction period) in which the inverting signal Scb' is at a Low level, even if the inverting signal Sp' is at the High level (an OFF instruction of the bypass switch 21b: a turning-on instruction), the control signal Spc is maintained at the High level (maintained at a turning-off state).

ON/OFF control of the bypass switch 22b is performed based on the control signal Spc as shown in FIG. 9, so that it is possible to prevent the semiconductor light emitting element 21b from erroneously being turned on along with the interlock dimming control during the period in which the semiconductor light emitting element 21b should be turned off for the light distribution control. On the other hand, in the period in which the semiconductor light emitting element 21b should be turned on for the light distribution control, the interlock dimming control is performed according to the drop in the input voltage Vb similar to the first embodiment, so that it is possible to prevent flickering in that the light emitting elements 21 are all turned off due to the drop in the input voltage Vb.

In the above description, in obtaining the control signal Spc based on the dimming signal Sp and the turning-on instruction signal Scb, a configuration in which the AND gate circuit 55 and inverting circuits 53, 54, 56 are combined has been illustrated. However, the control signal Spc may be generated by inputting the dimming signal Sp and the turning-on instruction signal Scb to an OR gate circuit.

In the above description, an OFF period of the dimming signal Sp, i.e., an OFF period of the bypass switch 21b (a turning-on period of the semiconductor light emitting element 21b) by the interlock dimming control, is shorter than the scan period of light by the movable reflector 10 in the light distribution control (See FIG. 9), but the OFF period of the dimming signal Sp may be equal to or longer than the scan period of light by the movable reflector 10.

However, in consideration of following aspects, it may be advantageous that the OFF period of the dimming signal Sp is shorter than the scan period of light by the movable reflector 10.

In the second embodiment, the interlock dimming control is performed in consideration of the turning-off instruction period in the light distribution control (in FIG. 9, the Low level period of the inverting signal Scb': hereinafter referred to as a turning-off instruction period S1). In this case, in the turning-off instruction period S1, a period in which the semiconductor light emitting element 21b should be originally turned on at the interlock dimming control side (hereinafter referred to as dimming side turning-on period S2) forcibly becomes a turning-off period. This situation can be expressed as superseding of the turning-off instruction period S1 to the dimming side turning-on period S2.

Herein, if the OFF period of the dimming signal Sp and the scan period of light are asynchronous, a phase relationship between the dimming signal Sp and the turning-on instruction signal Scb changes with time; as illustrated in FIG. 9, since a relatively large number of dimming side turning-on periods S2 overlap with the turning-off instruction periods S1 if the OFF period of the dimming signal Sp is sufficiently short with respect to the scan period of light, the superseding amount of the turning-off instruction period S1 to the dimming side turning-on period S2 does not change so much even when the phase relationship between the dimming signal Sp and the turning-on instruction signal Scb changes. That is, the change with time in the superseding amount is reduced.

On the other hand, when the OFF period of the dimming signal Sp is longer than the scan period of light, a length of the dimming side turning-on period S2 may be equal to or longer than a length of the turning-off instruction period S1. Accordingly, a state occurs in which the entire turning-on instruction period S1 overlaps with the dimming side turning-on period S2 with a length equal to or longer than the turning-on instruction period S1, i.e., a state in which the superseding amount of the turning-on instruction period S1 to the dimming side turning-on period S2 matches the length of the turning-on instruction signal S1 and a state in which the superseded amount of the dimming side turning-on period S2 becomes zero without any overlap between the turning-on instruction period S1 and the dimming side turning-on period S2 occur. That is, there is a fear that the superseding amount of the turning-off instruction period S1 to the dimming side turning-on period S2 largely changes with time due to the phase relationship between the dimming signal Sp and the turning-on instruction signal Scb. The fact that the superseding amount of the turning-off instruction period S1 to the dimming side turning-on period S2 greatly changes with time means that a light emission amount of the semiconductor light emitting element 21b by the interlock dimming control changes with time from an original light emission amount, so that there is a fear that such a change with time in the light emission amount may be visually recognized as flickering.

Therefore, as illustrated in FIG. 9, the OFF period of the dimming signal Sp is shortened than the scan period of light so as to suppress the change with time in the superseding amount of the turning-off instruction period S1 to the dimming side turning-on period S2, thereby suppressing such flickering.

In order to suppress the change with time in the light emission amount as described above, it is conceivable to synchronize the OFF period of the dimming signal Sp with the scan period of light by the movable reflector 10. However, since a configuration needs to be provided for synchronizing a rotational frequency of the movable reflector 10 and an oscillation frequency of the triangular wave, it may be advantageous that the OFF period of the dimming signal Sp be shorter than the scan period of light by the movable reflector 10 in order to simplify the configuration.

Herein, in the second embodiment described above, when the input voltage Vb is larger than the first threshold value TH1 and the non-dimming mode is selected, the interlock dimming control unit 50A controls ON/OFF of the bypass switch 22b based on the turning-on instruction signal Scb.

As described above, the drive circuit (3 or 3A) according to the embodiments of the present invention is configured to drive the light emitting unit (2 or 2A) which is provided in the vehicle lamp (1 or 1A) and includes a plurality of semiconductor light emitting elements (21a, 21b) connected in series, and includes: a drive voltage generation unit (4) configured to reduce the input voltage (Vb) of the battery to generate the drive voltage for driving the semiconductor light emitting elements; a control unit (the interlock dimming control unit 50 or 50A) configured to perform ON/OFF control for the bypass switch (22 or 22b) connected in parallel to a part of the semiconductor light emitting elements and to perform interlock dimming control which selects the dimming mode when the input voltage becomes the first threshold value (TH1) or lower and increases the ON ratio per unit time of the bypass switch as the input voltage drops in the dimming mode.

Accordingly, when the input voltage drops, the light emission amount of a part of the semiconductor light emitting elements gradually decreases in conjunction with the drop of the input voltage, and it is possible to prevent the light emission amount of the part of the semiconductor light emitting elements from sharply decreasing.

Therefore, it is possible to suppress flickering while preventing all the semiconductor light emitting elements from turning off due to the drop in the input voltage.

In the drive circuit according to the embodiment, the control unit is configured to maintain the bypass switch in the ON state in the dimming mode in a state where the input voltage has dropped to the second threshold value (TH2) or lower, which is lower than the first threshold value.

Accordingly, a part of the semiconductor light emitting elements is forcibly turned off in a state where the input voltage has dropped below the second threshold value. Therefore, it is possible to prevent the semiconductor light emitting elements from being all turned off due to the drop in the input voltage.

Further, in the drive circuit according to the embodiment, the control unit is configured to perform the interlock dimming control based on the PWM signal obtained by slicing the triangular wave with the threshold value (the value of the input voltage equivalent signal Vdb) according to the value of the input voltage.

Accordingly, it suffices to provide at least a triangle wave generation circuit and a comparator in generating the control signal (Sp) for the interlock dimming control. Therefore, it is possible to implement the interlock dimming control by a simple configuration.

Further, in the drive circuit according to the embodiments, the vehicle lamp (1A) is a variable light distribution type vehicle lamp which includes a movable reflector (10) having a reflecting surface (Rf) for reflecting light emitted from the light emitting unit (2A) and configured to change a direction of the reflected light from the reflecting surface according to the operating position to change the light distribution pattern, the bypass switch is connected in parallel to each of the plurality of semiconductor light emitting elements in the light emitting unit, and the control unit (the interlock dimming control unit 50A) is configured to perform the interlock dimming control during a period in which the turning-on instruction signal (Scb) input for light distribution control instructs turning-on of the semiconductor light emitting elements.

Accordingly, it is possible to prevent the semiconductor light emitting element from erroneously being turned on along with the interlock dimming control during a period in which the semiconductor light emitting elements should be turned off for light distribution control.

Therefore, it is possible to suppress flickering while preventing the semiconductor light emitting elements from being all turned off due to the drop in the input voltage, as well as preventing the light from being erroneously illuminated to an area which should not be originally illuminated in the light distribution control. That is, flickering when the input voltage drops can be suppressed while ensuring the accuracy of the light distribution control.

Further, in the drive circuit according to the embodiment, the OFF period of the bypass switch by the interlock dimming control is shorter than the scan period of light by the movable reflector.

Accordingly, it is possible to reduce the change with time in the superseding amount of the turning-off period instructed by the turning-on instruction signal to the turning-on period of the semiconductor light emitting elements by the interlock dimming control.

Therefore, in the case of performing the interlock dimming control under the light distribution control, it is possible to suppress the flickering due to the change with time in the light emission amount of a part of the semiconductor light emitting elements.

Further, the vehicle lamp according to the embodiment includes the drive circuit (3 or 3A) and the light emitting unit (2 or 2A) as the above-described embodiments.

Even with such a vehicle lamp, the same operation and effect as the drive circuit as the above-described embodiment can be obtained.

It should be noted that the present invention should not be limited to the specific embodiments described above.

For example, in the above description, the LED is used as the semiconductor light emitting element, but the inventive concept of the present invention may be suitably applied to the case where another semiconductor light emitting element such as a laser light emitting element is used.

Further, in the above description, two semiconductor light emitting elements are connected in series in the light emitting unit, but the number of semiconductor light emitting elements connected in series in the light emitting unit is not limited to two and may be three or more. At this time, in order to prevent the occurrence of an all turning-off state, there may be any number of the semiconductor light emitting element excluded from the object of interlock dimming control as long as there is at least one.

In the second embodiment, a rotary reflector is used as the movable reflector, but a swing-type movable reflector as disclosed in FIG. 14 of JP-A-2014-216049 can also be used. The movable reflector may have any configuration as long as the movable reflector has a reflecting surface for reflecting the light emitted from the light emitting unit and the direction of the reflected light from the reflecting surface changes according to the operation position.

Further, in the second embodiment, a configuration in which the turning-on instruction signal Sc for the light distribution control is supplied from the ECU 100 outside the vehicle lamp is illustrated. It is also possible to adopt a configuration in which the turning-on instruction signal Sc may be generated within the vehicle lamp, for example, generated by the control circuit 5 according to an instruction from the vehicle side.

Further, in the above description, the drive voltage generation unit is configured by a buck switching converter. The drive voltage generation unit, for example, may be configured by a series regulator or a current limiting resistor, and the drive voltage generation unit may be any as long as the drive voltage generation unit is configured to generate a drive voltage by reducing the input voltage from the battery to drive the semiconductor light emitting element.

The invention claimed is:

1. A drive circuit configured to drive a light emitting unit includes a plurality of semiconductor light emitting elements connected in series, the drive circuit comprising:
   a drive voltage generation unit configured to reduce an input voltage from a battery to generate a drive voltage for driving the semiconductor light emitting elements; and
   a control unit configured to:
      perform ON/OFF control for a bypass switch connected in parallel to a part of the semiconductor light emitting elements; and
      perform interlock dimming control that selects a dimming mode and increases an ON ratio per unit time of the bypass switch as the input voltage drops in the dimming mode,
         wherein, when the input voltage becomes a first threshold value or lower, the control unit performs the interlock dimming control.

2. The drive circuit according to claim 1,
   wherein the control unit is configured to maintain the bypass switch in an ON state in the dimming mode when the input voltage drops to a second threshold value or lower, the second threshold value being smaller than the first threshold value, and
   wherein the first and second threshold values are values that are received or set by the control unit.

3. The drive circuit according to claim 1,
   wherein the control unit is configured to perform the interlock dimming control based on a Pulse Width Modulation (PWM) signal obtained according to a triangular wave generated by the control unit and a third threshold value determined according to a value of the input voltage, and
   wherein the PWM signal is obtained such that a pulse width of the PWM signal is equal to a width of a portion of the triangular wave that is not less than the third threshold value.

4. The drive circuit according to claim 1,
   wherein the vehicle lamp is a variable light distribution type vehicle lamp that includes a movable reflector having a reflecting surface for reflecting light emitted from the light emitting unit and configured to change a direction of the reflected light from the reflecting surface according to an operation position to change a light distribution pattern,
   wherein a bypass switch is connected in parallel to each of the plurality of the semiconductor light emitting elements in the light emitting unit, and
   wherein the control unit is configured to perform the interlock dimming control during a period in which a turning-on instruction signal input for light distribution control instructs turning-on of the semiconductor light emitting elements.

5. The drive circuit according to claim 4,
   wherein an OFF period of the bypass switch by the interlock dimming control is shorter than a scan period of light by the movable reflector,
   wherein the OFF period of the bypass switch is a time period in which the control unit keeps the bypass switch in an OFF state, and
   wherein the scan period is a time period in which the movable reflector scans light emitted from the light emitting unit.

6. A vehicle lamp comprising:
   the drive circuit and the light emitting unit according to claim 1.

* * * * *